Jan. 17, 1961     H. ZOLLNER     2,968,221
PHOTOGRAPHIC FIVE-ELEMENT LENSES OF THE MODIFIED GAUSS TYPE
Filed March 17, 1959

Inventor:

United States Patent Office

2,968,221
Patented Jan. 17, 1961

2,968,221

PHOTOGRAPHIC FIVE-ELEMENT LENSES OF THE MODIFIED GAUSS TYPE

Harry Zollner, Jena, Germany, assignor to VEB Carl Zeiss Jena, Jena, Germany

Filed Mar. 17, 1959, Ser. No. 800,055

2 Claims. (Cl. 88—57)

This invention relates to a photographic five-element lens of the modified Gauss type, for taking and reproducing photographic images of the kind comprising a dispersive meniscus disposed between two convergent and outwardly convex menisci at either side of a diaphragm, the concave surface of said dispersive meniscus being conjugate to the diaphragm, the front of said two convergent menisci consisting of two cemented elements, and the rear of said convergent menisci consisting of a single element whose axial thickness, compared to the focal length of the lens, is smaller by 0.0265 fold and the radius of whose concave surface is smaller by 0.2 fold. The ratio of the radii of the front and the rear of said two concave surfaces is between 1.0 and 1.3.

The present invention aims at considerably improving the colour coma, particularly the transverse coma, of a lens of the foregoing kind and to this end, the lens is so constructed as to fulfill at the same time the following three conditions:

(a) The quotient of the objective focal length and the product of the focal length and the Abbe figure of the front convergent meniscus is to be between the magnitudes 0.017 and 0.022;

(b) The sum of the respective quotients of the said two cemented elements is to be between −0.049 and −0.060; and (c) The sum of the respective quotients of the said two elements in the rear of the diaphragm is to be between 0 and 0.003.

Advantageously the radius of the cemented surface of the pair of cemented elements has a positive magnitude at least equal to the focal length of the lens, and the difference of the refractive indices of the front and the rear element of this pair has a positive magnitude not greater than 0.1.

Figure 1:
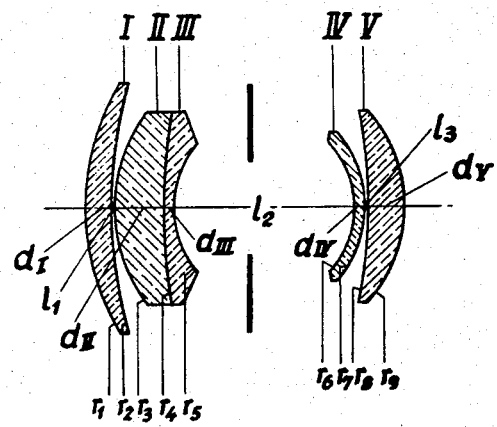

In order that the invention may be more readily understood, reference is made to the accompanying drawings which illustrate diagrammatically and by way of example, one embodiment thereof and in which:

Fig. 1 illustrates the type of lens according to the invention; and

Figure 2:
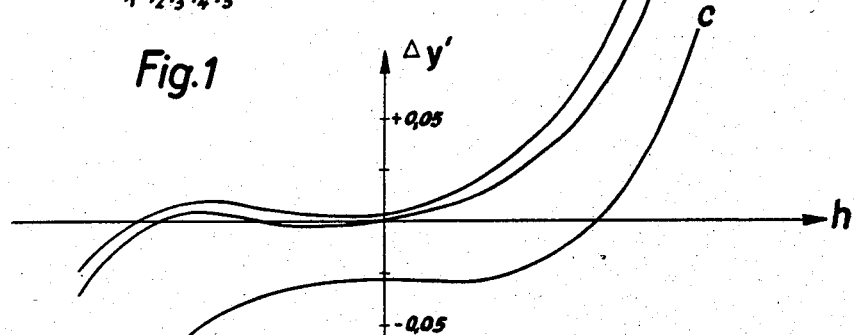
Figure 3:
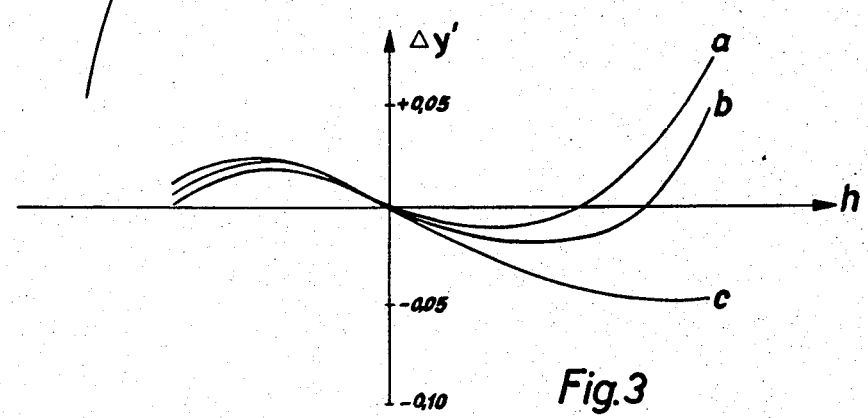

Figs. 2 and 3 show three curves, corresponding to the colours red, yellow and blue, of the meridional colour transverse coma of two lenses each of an image angle of 14°. The curves shown in Fig. 2 correspond to the meridional colour transverse comas of a highgrade lens hitherto obtainable in commerce, and the curves in Fig. 3 show the meridional colour transverse coma of a similar lens constructed according to the invention.

The lens according to Fig. 1 consists of five elements I to V. The elements I to III of which II and III are cemented, are in front and the elements IV and V in the rear of the diaphragm. The elements I and V are convergent and outwardly convex menisci. The pair of cemented elements II and III and the element IV are dispersive menisci the concave surfaces of which are conjugate to the diaphragm. The radii of the surfaces of the elements are designated $r_1$ to $r_9$, the thicknesses $d_I$ to $d_V$ and the distances apart $l_1$ to $l_3$.

The following two tables show the radii, thicknesses and distances apart as well as the focal lengths $f_I$ to $f_V$ of the elements, the refractive indices $n_{d_I}$ to $n_{d_V}$, and the Abbe figures $\nu_I$ to $\nu_V$ of the embodiments of a lens according to the invention. In both cases the focal length of the lens is 100 and the aperture ratio 1:2.8. The image angle is 55° in the first and 46° in the second example.

Example I
$f=100 \quad 1:2.8 \quad 55°$

| | | | | |
|---|---|---|---|---|
| $r_1=+45.8$ | $d_I=5.5$ | $n_{d_I}=1.6668$ | $\nu_I=33.1$ | $f_I=+144.69$ |
| $r_2=+83.0$ | $l_1=0.12$ | | | |
| $r_3=+30.6$ | $d_{II}=9.8$ | $n_{d_{II}}=1.6935$ | $\nu_{II}=53.5$ | $f_{II}=+58.32$ |
| $r_4=+109.2$ | $d_{III}=2.1$ | $n_{d_{III}}=1.6889$ | $\nu_{III}=31.1$ | $f_{III}=-35.45$ |
| $r_5=+19.8$ | $l_2=19.4$ | | | |
| $r_6=-18.3$ | $d_{IV}=2.4$ | $n_{d_{IV}}=1.7283$ | $\nu_{IV}=28.3$ | $f_{IV}=-122.40$ |
| $r_7=-24.3$ | $l_3=0.12$ | | | |
| $r_8=-123.0$ | $d_V=7.8$ | $n_{d_V}=1.6204$ | $\nu_V=60.3$ | $f_V=+56.65$ |
| $r_9=-28.0$ | | | | |

Example II
$f=100 \quad 1:2.8 \quad 46°$

| | | | | |
|---|---|---|---|---|
| $r_1=+45.8$ | $d_I=7.2$ | $n_{d_I}=1.6676$ | $\nu_I=41.9$ | $f_I=+134.06$ |
| $r_2=+87.9$ | $l_1=0.17$ | | | |
| $r_3=+30.3$ | $d_{II}=10.5$ | $n_{d_{II}}=1.6584$ | $\nu_{II}=50.8$ | $f_{II}=+46.33$ |
| $r_4=\infty$ | $d_{III}=2.5$ | $n_{d_{III}}=1.6483$ | $\nu_{III}=33.8$ | $f_{III}=-29.62$ |
| $r_5=+19.2$ | $l_2=20.9$ | | | |
| $r_6=-18.3$ | $d_{IV}=2.6$ | $n_{d_{IV}}=1.7283$ | $\nu_{IV}=28.3$ | $f_{IV}=-124.50$ |
| $r_7=-24.3$ | $l_3=0.08$ | | | |
| $r_8=-117.0$ | $d_V=8.1$ | $n_{d_V}=1.6204$ | $\nu_V=60.3$ | $f_V=+58.14$ |
| $r_9=-28.3$ | | | | |

The curves $a$, $b$ and $c$ of the meridional transverse coma in Figs. 2 and 3 represent respectively the colours red, yellow and blue and relate to a system of rectangular coordinates in which the abscissa of the height of incidence $h$ and the ordinates correspond to the colour transverse deviation $\Delta y'$. A comparison of the curves of the two figures shows how complete is the correction of the colour transverse deviation in the lens according to the invention, referred to in Fig. 3. Moreover, the deviations of the meridional coma are smaller than in the well-known lens according to Fig. 2, which has been in use so far.

I claim:

1. A photographic five-element lens having between two convergent and outwardly convex menisci and at either side of a diaphragm a dispersive meniscus the concave surface of which is conjugate to said diaphragm, the front of said two dispersive menisci consisting of two cemented elements and the rear of said dispersive menisci consisting of a single element whose axial thickness, compared to the focal length of said lens, is smaller by 0.0265 fold and the radius of whose concave surface is smaller by 0.2 fold, the quotient $$\left(\frac{f}{f_I \nu_I}\right)$$

of the objective focal length ($f$) and the product of the focal length ($f_I$) and the Abbe figure ($\nu_I$) of said front convergent meniscus (I) being between the magnitudes 0.017 and 0.022, the sum of the respective quotients $$\left(\frac{f}{f_{II} \cdot \nu_{II}} + \frac{f}{f_{III} \cdot \nu_{III}}\right)$$

of the said two cemented elements (II and III) being between the magnitudes —0.049 and —0.060, the sum of the respective quotients of the said two elements (IV and V) in the rear of said diaphragm being between 0 and 0.003, the radius ($r_4$) of the cemented surface of said pair of cemented elements (II and III) having a positive magnitude at least equal to the objective focal length ($f$), and the difference of the refractive indices of the front element (II) and the rear element (III) of said pair having a positive magnitude not greater than 0.1, characterized by the following magnitudes of the radii of curvature $r$ of the surfaces, the thicknesses $d$, the distances apart $l$, the refractive indices $n_d$, the Abbe figures and the focal lengths of said five elements I to V referring to a focal length $f=100$, a ratio of aperture 1:2.8 and an image angle of 55°;

| | | | | |
|---|---|---|---|---|
| $r_1=+45.8$ | $d_I = 5.5$ | $n_{d_I} = 1.6668$ | $\nu_I = 33.1$ | $f_I = +144.69$ |
| $r_2= +83.0$ | $l_1 = 0.12$ | | | |
| $r_3=+30.6$ | $d_{II} = 9.8$ | $n_{d_{II}} = 1.6935$ | $\nu_{II} = 53.5$ | $f_{II} = +58.32$ |
| $r_4=+109.2$ | $d_{III}= 2.1$ | $n_{d_{III}}=1.6889$ | $\nu_{III}=31.1$ | $f_{III}=-35.45$ |
| $r_5=+19.8$ | $l_2 =19.4$ | | | |
| $r_6=-18.3$ | $d_{IV}= 2.4$ | $n_{d_{IV}}=1.7283$ | $\nu_{IV}=28.3$ | $f_{IV}=-122.40$ |
| $r_7=-24.3$ | $l_3 = 0.12$ | | | |
| $r_8=-123.0$ | $d_V = 7.8$ | $n_{d_V} = 1.6204$ | $\nu_V =60.3$ | $f_V =+56.65$ |
| $r_9=-28.0$ | | | | |

2. A photographic five-element lens having between two convergent and outwardly convex menisci and at either side of a diaphragm a dispersive meniscus the concave surface of which is conjugate to said diaphragm, the front of said two dispersive menisci consisting of two cemented elements and the rear of said dispersive menisci consisting of a single element whose axial thickness, compared to the focal length of said lens, is smaller by 0.0265 fold and the radius of whose concave surface is smaller by 0.2 fold, the quotient $$\left(\frac{f}{f_I \nu_I}\right)$$

of the objective focal length ($f$) and the product of the focal length ($f_I$) and the Abbe figure ($\nu_I$) of said front convergent meniscus (I) being between the magnitudes 0.017 and 0.022, the sum of the respective quotients $$\left(\frac{f}{f_{II} \cdot \nu_{II}} + \frac{f}{f_{III} \cdot \nu_{III}}\right)$$

of the said two cemented elements (II and III) being between the magnitudes —0.049 and —0.060, the sum of the respective quotients of the said two elements (IV and V) in the rear of said diaphragm being between 0 and 0.003, the radius ($r_4$) of the cemented surface of said pair of cemented elements (II and III) having a positive magnitude at least equal to the objective focal length ($f$), and the difference of the refractive indices of the front element (II) and the rear element (III) of said pair having a positive magnitude not greater than 0.1, characterized by the following magnitudes of the radii of curvature $r$ of the surfaces, the thicknesses $d$, the distances apart $l$, the refractive indices $n_d$, the Abbe figures $\nu$ and the focal lengths of said five elements I to V referring to a focal length $f=100$, a ratio aperture 1:2.8 and an image angle of 46°;

| | | | | |
|---|---|---|---|---|
| $r_1=+45.8$ | $d_I = 7.2$ | $n_{d_I} = 1.6676$ | $\nu_I = 41.9$ | $f_I = +134.06$ |
| $r_2= +87.9$ | $l_1 = 0.17$ | | | |
| $r_3= +30.3$ | $d_{II} =10.5$ | $n_{d_{II}} =1.6584$ | $\nu_{II} =50.8$ | $f_{II} =+46.33$ |
| $r_4=\infty$ | $d_{III}= 2.5$ | $n_{d_{III}}=1.6483$ | $\nu_{III}=33.8$ | $f_{III}=-29.62$ |
| $r_5=+19.2$ | $l_2 =20.9$ | | | |
| $r_6= -18.3$ | $d_{IV}= 2.6$ | $n_{d_{IV}}=1.7283$ | $\nu_{IV}=28.3$ | $f_{IV}=-124.50$ |
| $r_7= -24.3$ | $l_3 = 0.08$ | | | |
| $r_8=-117.0$ | $d_V = 8.1$ | $n_{d_V} =1.6204$ | $\nu_V =60.3$ | $f_V = +58.14$ |
| $r_9= -28.3$ | | | | |

References Cited in the file of this patent

UNITED STATES PATENTS

| | | |
|---|---|---|
| 2,399,858 | Cox | May 7, 1946 |
| 2,499,264 | Wynne | Feb. 28, 1950 |
| 2,672,788 | Brendel | Mar. 23, 1954 |
| 2,683,398 | Klemt et al. | July 13, 1954 |
| 2,831,395 | Klemt | Apr. 22, 1958 |

FOREIGN PATENTS

| | | |
|---|---|---|
| 765,548 | Great Britain | Jan. 9, 1957 |
| 1,097,695 | France | Feb. 23, 1955 |